United States Patent [19]

Kohn et al.

[11] 3,918,918
[45] Nov. 11, 1975

[54] CATALYTIC REACTOR

[75] Inventors: Harold B. Kohn, Cedar Grove; George Friedman, Clark, both of N.J.

[73] Assignee: The Lummus Company, Bloomfield, N.J.

[22] Filed: Aug. 8, 1974

[21] Appl. No.: 495,569

Related U.S. Application Data

[63] Continuation of Ser. No. 234,831, March 15, 1972, abandoned.

[52] U.S. Cl............ 23/288 K; 23/289; 23/288 R; 23/288 L; 165/66; 165/155
[51] Int. Cl.² ................... B01J 8/04; B01J 8/00
[58] Field of Search .. 23/289, 288 R, 288 L, 288 N, 23/288 K; 165/66, 155

[56] References Cited
UNITED STATES PATENTS

| | | | |
|---|---|---|---|
| 3,622,266 | 11/1972 | Laukel | 23/289 X |
| 3,653,846 | 4/1972 | Kubec et al. | 23/289 |
| 3,666,423 | 5/1972 | Muenger | 23/288 L |
| 3,694,169 | 9/1972 | Fawcett et al. | 23/289 |
| 3,753,662 | 8/1973 | Pagani et al. | 23/289 |

*Primary Examiner*—James H. Tayman, Jr.
*Attorney, Agent, or Firm*—Marn & Jangarathis

[57] ABSTRACT

A catalytic reactor for two stage reactions but involving only a single catalyst bed having an intermediate impervious seal dividing such bed into two distinct reaction zones, and including an interstage feed-effluent heat exchanger and a preliminary mixing stage. By providing a single reactor unit capable of all of the noted functions, problems with thermal expansion, high pressure drops and excessive residence time are minimized.

5 Claims, 7 Drawing Figures

CATALYTIC REACTOR

This is a continuation of application Ser. No. 234,831, filed 3/15/72 and now abandoned.

BACKGROUND OF THE INVENTION

1. Field of the Invention

This invention relates generally to catalytic reactors and, more particularly, it relates to catalytic reactors including a feed-effluent heat exchanger. Specifically, the invention relates to a two-stage, single bed catalytic reactor having an interstage feed-effluent heat exchanger and, if desired, a mixing stage for separate feeds prior to reaction. All of this is carried out within a single vessel with no external piping other than a feed inlet or inlets and a reaction product outlet.

It has long been recognized as advantageous to employ feed-effluent heat exchange as a method of temperature control in carrying out exothermic and endothermic catalytic reactions. A typical reactor for ammonia or methanol synthesis is comprised of an outer pressure vessel with an inlet at one end, usually the top, and an outlet at the other and an inner shell defining heat exchange and catalyst bed sections. The reactant gas is introduced at the catalyst bed end or top and is passed through the length of the reactor in the space between the inner and outer shells thereby exchanging heat with the inner shell wall. The gas is then introduced into the shell side of a shell and tube heat exchanger wherein the gas is heated by an effluent gas being withdrawn from the reactor on the tube side thereof. From the heat exchanger, the gas may be passed upwardly through a central conduit and radially outwardly through the catalyst bed, and thence back to the tube side of the exchanger, but many variations are known. Thus, the gas may pass up through a conduit into a chamber and then down through the bed or beds. It may be directed radially through a top bed and then through a lower bed, etc. A problem with all such reactors is that the catalyst beds are located in the very heart of the reactor and access thereto for replacement with fresh catalyst is both difficult and expensive, and downtime may be substantial.

In many catalytic systems there is no combination of elements as above described at all, a separate unit being employed for each function. Thus, for a two stage reaction, two reactors are provided with an interstage heat exchanger utilized to preheat the first stage feed. If more than one reactant is involved, a separate mixer may be used. For large volume systems such as low pressure or vacuum phase dehydrogenation, where temperatures are very high, the interconnection piping presents major thermal expansion problems, and results in high pressure drops and excessive residence times. As is well known, in systems where undesirable side reactions can take place, residence time outside the catalyst bed results in reduced yields of the desired product and is wasteful of feedstock.

2. Prior Art

A reactor designed for improved maintenance is disclosed in U.S. Pat. No. 3,475,136. The bulk of the catalyst is removed by gravity flow through downcomer pipes communicating with each basket, but the remainder must be manually removed.

Double-walled tubes are disposed through the catalyst bed in the reactor described in U.S. Pat. No. 3,459,511.

Coolant gas is passed through the inner tube and feed gas is distributed through holes in the outer tube.

There are many patents disclosing reactors of the integral heat exchanger type, in addition to those just mentioned. U.S. Pat. No. 3,472,631 provides for horizontal reactant flow through the catalyst beds with cooling tubes at both sides. A common provision is a cold feed by-pass stream which can be used to control catalyst bed "hot spots," as disclosed in U.S. Pat. No. 3,475,137. Other typical integral exchanger reactors are disclosed in U.S. Pat. Nos. 3,366,461 and 3,372,988.

OBJECTS OF THE INVENTION

A general object of the present invention is to provide a two stage catalytic reactor having a single catalyst bed.

Another object of the present invention is to provide a two stage catalytic reactor with interstage feed-effluent heat exchange.

A further object of the present invention is to provide a catalytic reactor wherein removal and charging of catalyst is greatly simplified.

A still further object of the present invention is to provide a two stage catalytic reactor with a pre-reaction mixing stage.

Still another object of the present invention is to provide a two stage catalytic reactor including interstage heat exchange and optional pre-reaction mixing, and wherein there is no external piping, residence time and pressure drop are both minimized.

A still further object of the invention is to provide a catalytic reactor wherein thermal expansion is accomodated by simple sliding seals on concentric cylinders.

Yet another object of the present invention is to provide a reactor capable of reactant mixing, first stage catalysis, feed-effluent heat exchange and second stage catalysis, all within a single vessel without any external interconnecting piping.

DESCRIPTION OF THE DRAWINGS

Various other objects and advantages of the invention will become clear from the following detailed description of embodiments thereof, and the novel features will be particularly pointed out in connection with the appended claims.

Reference will hereinafter be made to the accompanying drawings, in which.

DESCRIPTION OF EMBODIMENTS

Figure 1:
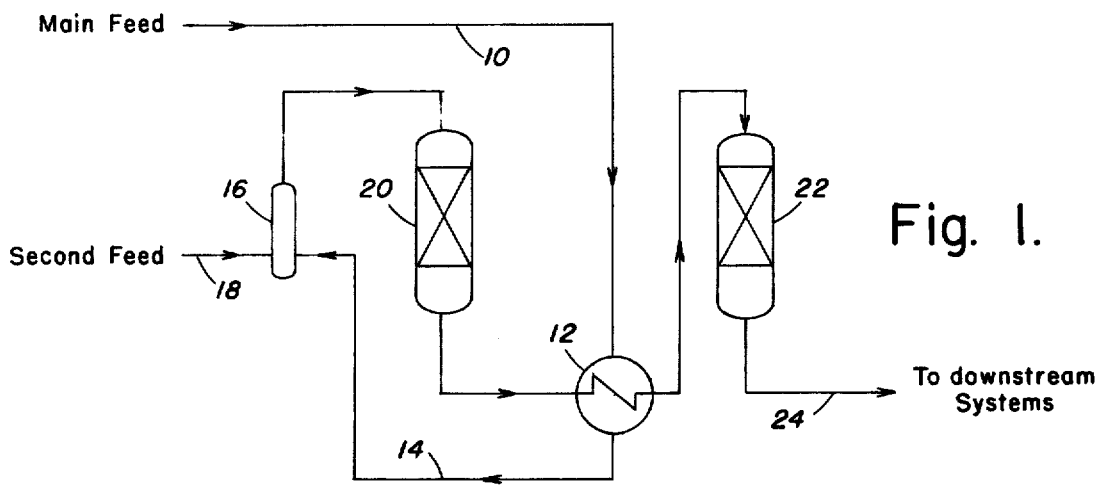
FIG. 1 is a schematic flow diagram showing the four processing stages and their interrelation.

FIG. 1 shows in purely schematic terms what is desirable to accomplish in a two stage catalytic reactor with intermediate feed-efflluent heat exchange and pre-reaction mixing. As shown, a feed stream 10 is passed through the shell side of a heat exchanger 12 in heat transfer relationship with the effluent from the first stage catalytic bed 20 passing through the tube side of heat exchanger 12. The preheated feed in line 14 is passed to mixer 16 and contacted with a second feed in line 18. The combined stream is then passed through first stage catalytic bed 20, the tube side of heat exchanger 12, and second stage catalytic bed 22, in that order. Product stream 24 is withdrawn from catalyst bed 22 for further downstream processing, as required.

It will be appreciated that if such a system were constructed of individual units a great deal of interconnecting piping would be required, with attendant thermal expansion problems, high pressure drops and long residence times. Even a system where, for example, the mixer 16 is integral with the first stage 20, and the exchanger 12 is integral with the second stage 22, would necessarily require external interconnections.

Figure 2:
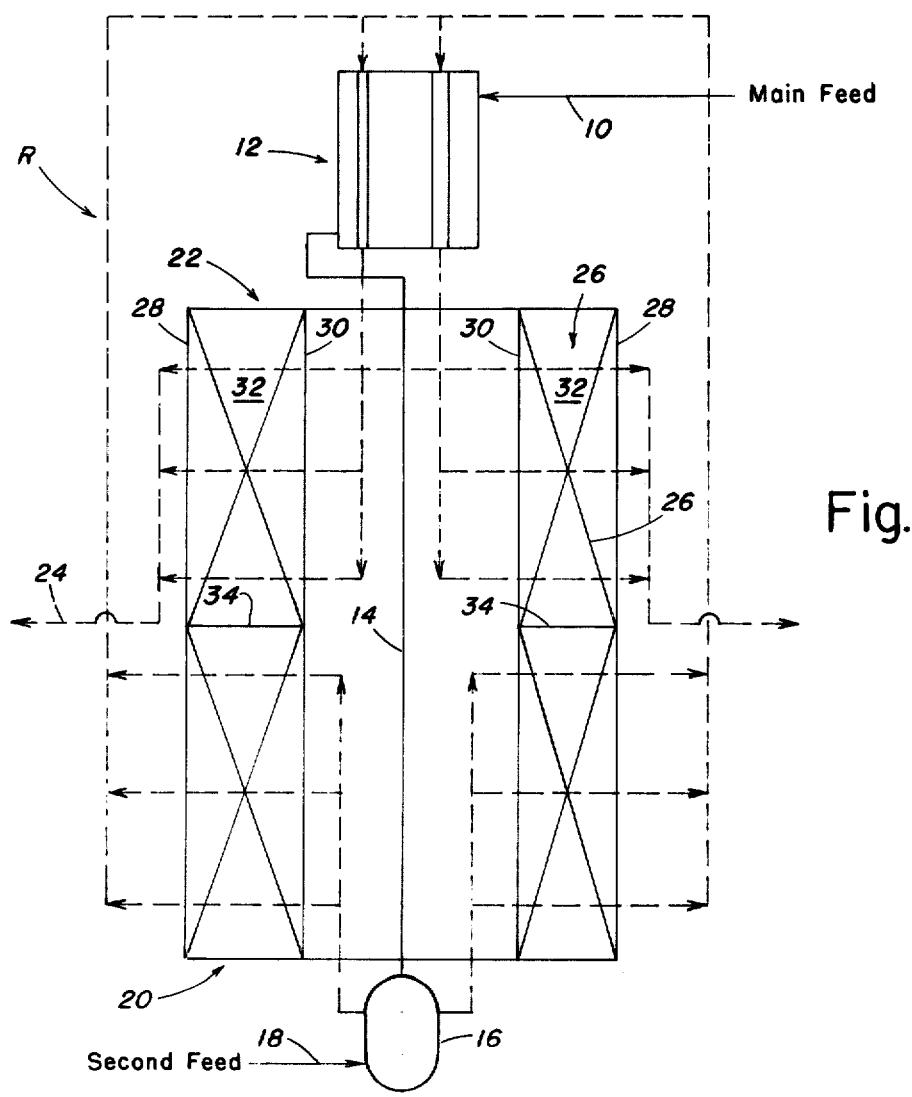
FIG. 2 is a schematic representation of an embodiment of the invention showing the location of the four processing stages.

FIG. 2 illustrates in schematic form the general layout and flow patterns for a two stage reactor R in accordance with the present invention, wherein all of the above noted functions are carried out within a single vessel, but for the purpose of clarity is not shown in FIG. 2.

The present invention is based, at least in part, on the use of a single catalyst bed, generally indicated as 26, in the form of cylinder having an outer perforate wall 28, an inner perforate wall 30, and catalyst 32 filling the space therebetween. This is divided into a lower zone forming a first reaction stage, generally indicated as 20, and an upper zone forming a second reaction stage, generally indicated as 22. The heat exchanger 12 is integral with the reactor and is disposed at one end of the catalyst bed 26, as is mixer 16, at the other end thereof (it will be appreciated that the reactor could be operated with either end at the top, but as shown and herein described heat exchanger 12 is positioned at the upper end).

In operation, reactants in line 10 are introduced and passed through the shell side of the exchanger 12, and thence through conduit 14 to a mixer 16. As explained in detail hereinbelow, conduit 14 plays an important role in directing reactants into the proper zones of the catalyst 26. A second reactant may or may not be added to the mixer 16. As shown by the dotted flow lines, from mixer 16, the reactants flow upwardly about the space defined by the conduit 14 and inner wall 30, and radially outwardly through the lower, first stage reaction zone 20. Reactants and first stage reaction products are then carried upwardly in an annular passage to the top of the reactor, where they enter the tube side of exchanger 12. From exchanger 12, the reactants again flow into the space defined by conduit 14 and inner wall 30, but now they are flowing downwardly rather than upwardly. The reactants flow radially outwardly through the upper, second stage reaction zone 22, into a second annular passage, after which they are removed from the reactor in a line 24.

Changing of catalyst 32 is accomplished by allowing spent catalyst to fall by gravity from the bottom of bed 26 and charging fresh catalyst at the top. Since, in accordance with the invention, a single bed 26 is utilized for both reaction stages, it is necessary to insure that reactants flow radially outwardly therethrough and not up or down, which would result in mixing of first and second stage reactants. This is accomplished by merely charging horizontal plugs along with cataylst so that plugs appear periodically within the column, and providing a "neutral" zone intermediate the upper and lower stages where reactants can not enter radially, and which is of sufficient length to have a plug therein at all times. A plug is shown schematically at 34 in FIG. 2.

Figure 3:
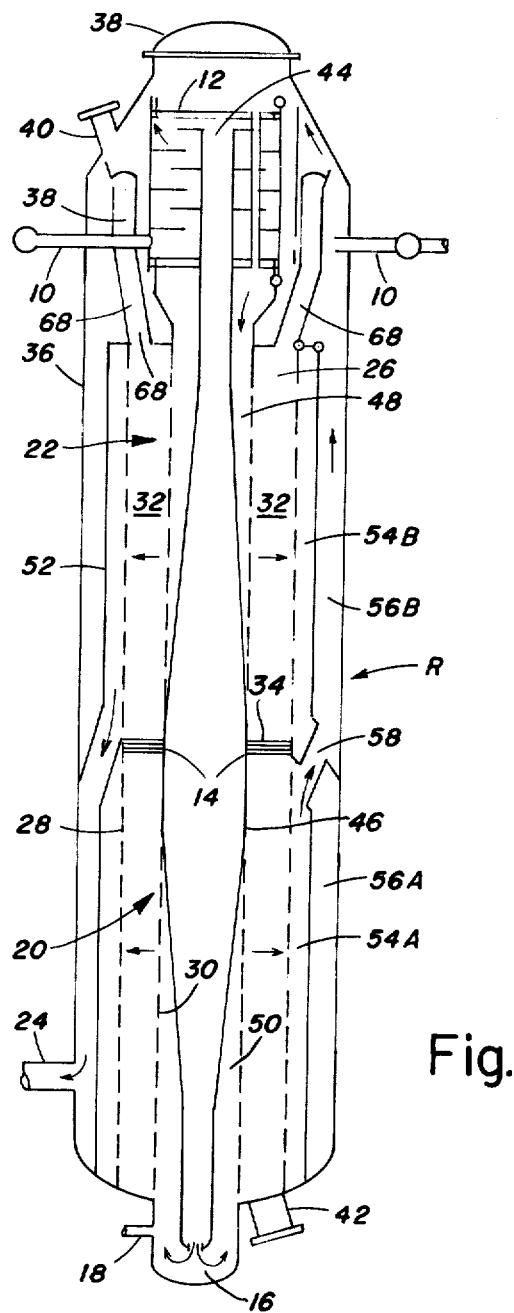
FIG. 3 is a simplified cross-sectional elevation of an embodiment of the invention.

A simplified cross-sectional elevation of a reactor in accordance with the invention is illustrated in FIG. 3. A pressure vessel 36 is constructed of materials and design suitable for the intended use of the reactor R. The reactor R is provided with a removable cover 38, a plurality of ports 40 for loading catalyst at the top end, and a plurality of ports 42 at the lower end for unloading catalyst. The arrangement of internal parts is generally similar to that shown schematically in FIG. 2, and like reference numerals have been used. In particular, the heat exchanger 12 is of conventional construction, the shell side of which is in fluid communications with inlet lines 10 and, at the upper end therof, with a chamber 44. The conduit 14 is of a length almost equal to the entire length of the reactor and is on the axis thereof. The upper end of the conduit 14 is in fluid communication with chamber 44. At its lower end the conduit 14 is in fluid communication with a mixing zone 16, as is a secondary reactant feed line 18. It is noted that conduit 14 expands to fill the entire central portion of the bed structure at the neutral zone 46, thus dividing the space between inner catalyst bed wall 30 and conduit 14 into an upper chamber 48 and a lower chamber 50, coresponding to the respective second and first reaction zones radially adjacent thereto. The outer surface of conduit 14 is preferably shaped so as to act as a deflector of reactants into the catalyst 32, so that the bed is utilized evenly.

Between the catalyst bed 32 and the inside wall of pressure vessel 36 there is diposed an annular inner wall 52 dividing the available space into the two approximately equal, annular chambers 54 and 56. Both chambers 54 and 56 are divided into upper and lower portions, the lower portions being designated A and the upper portions being designated B. At the level of neutral zone 46, there is a cross-over, generally indicated as 58, arrangement so that lower, inner annular chamber 54A is in fluid communication with the upper, outer annular chamber 56B. Similarly, the upper, inner chamber 54B is in fluid communication with the lower, outer chamber 56A. Each of the inner chambers 54A and 54B are in fluid communication with the adjacent portions of the catalyst bed 32 via the perforate wall 30, but are not in fluid communication with each other. The upper, outer chamber 56B is open at the top and is in fluid communication with the tube side of exchanger 12.

Thus, the reactants are passed through chamber 50 into the lower first stage reaction stage 20 and thence through chambers 54A and 56B into exchanger 12. The reactants are passed downwardly through the tubes of exchange 12 into chamber 48 from which the reactants are evenly passed through the second reaction stage 22.

The top end of chamber 54B is closed, so reaction products leaving the second reaction zone 22 must pass from chamber 54B to chamber 56A, and the latter communicates with outlet 24 of the vessel 36.

The top end of the bed 26 is closed, and a plurality of chutes 68 communicate with catalyst loading ports 40 (one shown). The unloading ports 42 communicate directly with the bottom of the bed. It will be noted that mixer 16 is at a minimum distance from the feed deflector (i.e. the wall of conduit 14) to minimize non-catalytic residence time. The same relation holds true between the bottom of exchanger 12 and the second reaction stage 22.

Figure 4:
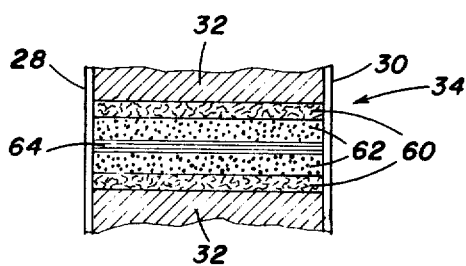
FIG. 4 is a schematic drawing of a seal or plug used to prevent interstage gas leakage.

The structure of a suitable dynamic seal or plug that will move downwardly with the catalyst and prevent interstage gas leakage is shown in FIG. 4. A plug may be comprised of a plurality of layers of inert granular material of selected particle size and chemically inert, such as sand. By proper selection of grain size, the system can be arranged so as to prevent fine particle migration into the lower catalyst bed as well as prevent interstage leakage. Referring to FIG. 4, the seal 34 is comprised of a five layer "sandwich" comprising top and bottom layers 60 of overlapping pieces of metal wool, intermediate layers 62 of catalyst fines, and central layer 64 of metal foil pieces.

It will be appreciated that details of reactor construction, instrumentation, insulation, etc. will vary markedly with the intended use thereof, and will be readily determined by one skilled in the particular reactions and reaction conditions required. However, it should be apparent that reactors in accordance with this invention are particularly suited for use in vacuum or low pressure systems, and systems whose reactivity continues outside the catalytic environment. Also, the elimination of external piping is desirable in any very large system or where metal specifications call for alloy materials.

All flows are annular or radial, and internal walls are designed only for pressure drop and catalyst support. If an internal structural failure should occur, it would be confined within the vessel and would not present hazard.

The design of the feed deflector should provide a gradual decrease in inlet cross-section along the inlet wall 30 of the catalyst bed as well as to occupy pre-reaction space to reduce residence times of hot reactants.

Figure 5:
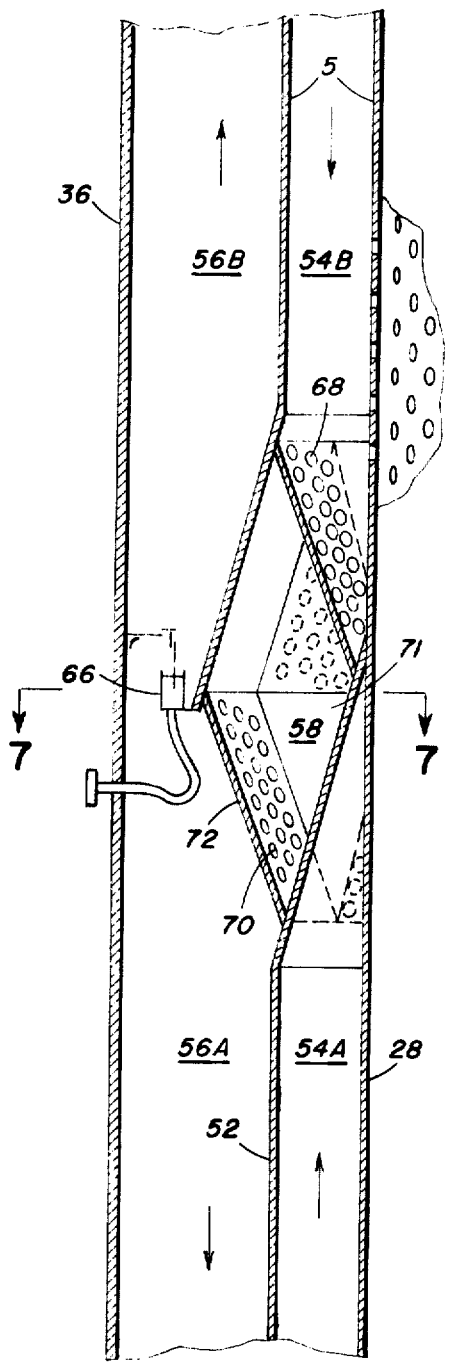
FIG. 5 is a partial cross-sectional view of one type of cross-over structure for parallel annular channels.

Internal thermal expansion problems are solved by providing expansion seals for concentric cylinders. Many types are known. A variety of means are also available for construction of the cross-over portion, but one example is illustrated in more detail in FIGS. 5 and 7. Thus, at the cross-over point, annular wall 52 is tapered in to join perforated wall 28, (a portion illustrated) from one side and the outer wall 36 from the other with expansion joints and seals 66 being provided particularly at the latter point. A plurality of plates 71 are uniformly and vertically disposed within the cross-over section 58, thereby forming cross-over subsections. A plurality of orifices 68 and 70 are provided in facing tapered portions in alternating subsections thereby permitting fluid communication betwen chamber 56A and 54B, and chambers 56B and 54A as hereinabove discussed.

Figures 6, 7:
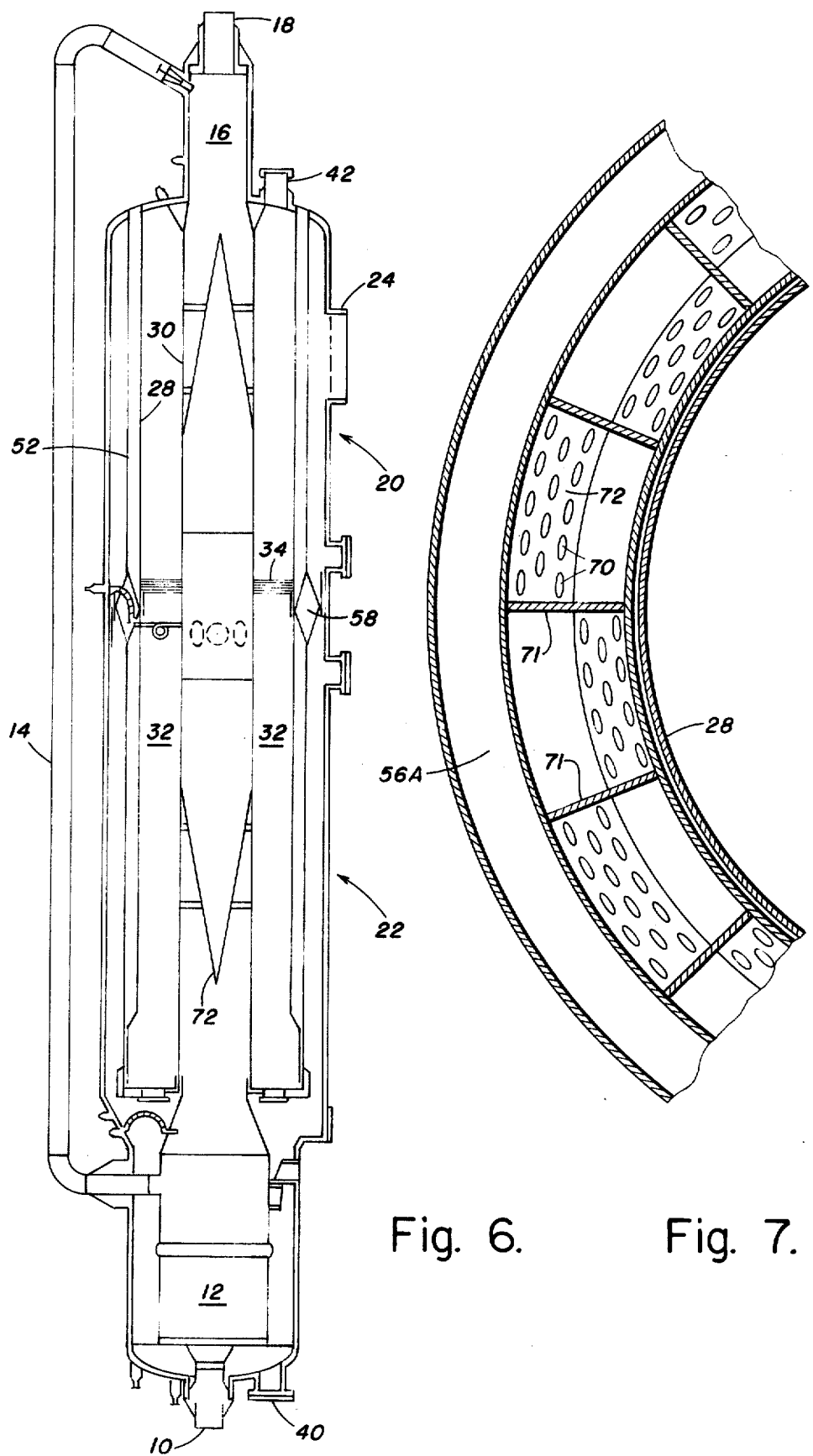
FIG. 6 is a more detailed cross-sectional elevation of another embodiment of the invention.
FIG. 7 is a cross-sectional view of the cross-over structure of FIG. 5 taken along the lines 7—7 thereof.

It is possible to make many changes in the reactor design hereinabove disclosed, including using only some rather than all of the features. FIG. 6 illustrates one such variation wherein conduit 14 is provided external of the reactor R. Feed inlet 10 is located in the bottom of the reactor (a second inlet could also be provided) where reactants pass directly into the first reaction zone. The remainder of the reactor is as previously described.

Various changes in the details, steps, materials, and arrangements of parts, which have been herein described and illustrated in order to explain the nature of the invention, may be made by those skilled in the art within the principle and scope of the invention as defined in the appended claims.

What is claimed is:

1. A catalytic reactor for two stage reactions in a single catalyst bed with interstage feed-effluent heat exchange comprising:

an upright, cylindrical reactor vessel;
an elongated annular catalyst bed secured in but spaced from said vessel by annular perforated wall means in coaxial alignment with that of said vessel;
a heat exchanger having a shell side and a tube side adjacent one end of said bed;
seal means within said catalyst bed and dividing same into a lower first stage and an upper second stage;
means including reactant fluid deflector means dividing the annulus defined by said bed into upper and lower feed chambers corresponding to said first and second stages;
a fluid inlet communicating with the inlet on one side of said heat exchanger;
a fluid outlet from said one side of said heat exchanger;
means communicating with said fluid outlet of said one side of said heat exchanger with said lower first stage;
means between said first stage and said vessel for receiving first stage effluent and communicating with the inlet on the other side of said heat exchanger;
means communicating with the outlet of said other side of said heat exchanger and said upper second stage;
reactor effluent outlet; and
means between said second stage and said vessel for receiving second stage effluent and communicating with said reactor effluent outlet.

2. The reactor as claimed in claim 1 and additionally comprising a second fluid inlet adjacent said lower feed chamber.

3. The reactor as claimed in claim 1, wherein the means connecting said other side with said lower feed chamber comprise a conduit having an outer surface shaped so as to define said fluid deflector means.

4. The reactor as claimed in claim 1, and additionally comprising access means in said vessel adjacent the top and bottom of said bed for the respective charging and discharging of catalyst.

5. The reactor as claimed in claim 1, and additionally comprising a plurality of said seal means periodically spaced along the length of said bed.

* * * * *